United States Patent [19]
Wu et al.

[11] 3,873,609
[45] Mar. 25, 1975

[54] CONTINUOUS SLURRY PROCESS FOR FORMATION OF AROMATIC POLYCARBOXYLIC ACIDS

[75] Inventors: Yu-Lin Wu; Paul S. Hudson; Fred T. Sherk; Donald M. Haskell, all of Bartlesville, Okla.

[73] Assignee: Phillips Petroleum Company, Bartlesville, Okla.

[22] Filed: Jan. 5, 1973

[21] Appl. No.: 321,523

[52] U.S. Cl. .......................................... 260/515 P
[51] Int. Cl. ...................... C07c 63/14, C07c 63/26
[58] Field of Search ................................. 260/515 P

[56] References Cited
UNITED STATES PATENTS
2,905,709  9/1959  Schenk et al. ..................... 260/515
3,261,863  7/1966  Schenk et al. ..................... 260/515
3,781,341  12/1973  Wu et al. ............................ 260/515

*Primary Examiner*—James A. Patten

[57] ABSTRACT

The solid-state disproportionation of potassium benzoate to dipotassium terephthalate and benzene using zinc benzoate catalyst is conducted with the solid reagents dispersed as a slurry in liquid terphenyl diluent. The reactor effluent is water-quenched to obtain a liquid terphenyl phase, a water phase containing dissolved phthalates, and solid spent zinc oxide catalyst. The catalyst is separated by filtration, reslurried in terphenyl, reacted with benzoic acid to regenerate zinc benzoate, and the resultant catalyst slurry recycled to the reactor. The solids-free aqueous phase is contacted with benzoic acid to precipitate terephthalic acid crystals and form soluble potassium benzoate. The crystals are separated by filtration and recovered as a product of the process. The aqueous potassium benzoate solution is concentrated by evaporation and then contacted with hot terphenyl to produce a slurry of solid potassium benzoate in terphenyl for recycle to the reactor. Byproduct benzene is vented from the reactor and/or the effluent quench step.

8 Claims, 1 Drawing Figure

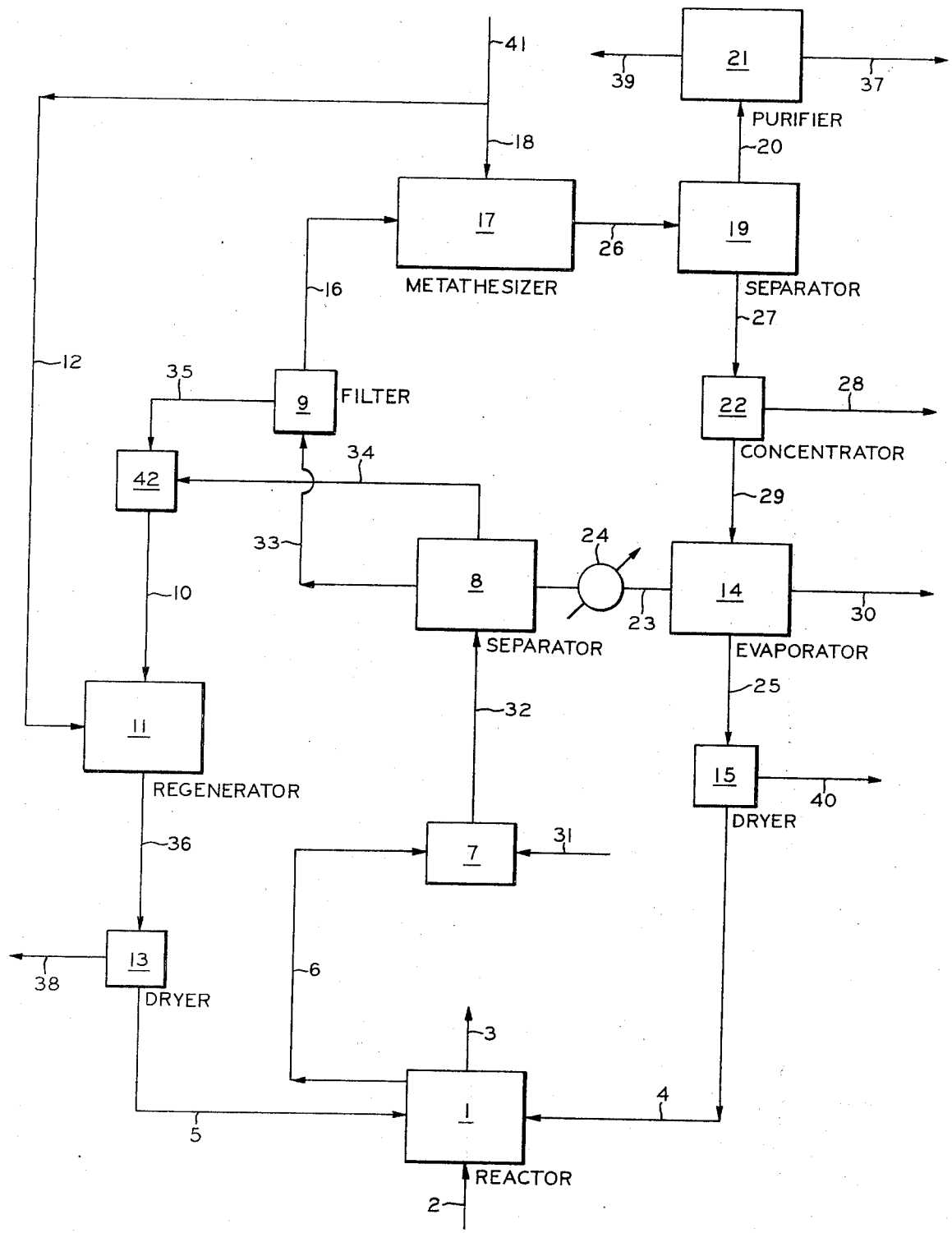

CONTINUOUS SLURRY PROCESS FOR FORMATION OF AROMATIC POLYCARBOXYLIC ACIDS

This invention relates to the production of aromatic carboxylic acids from aromatic polycarboxylates. This invention further relates to the production of aromatic polycarboxylates by disproportionation of alkali metal salts of aromatic carboxylic acids.

BACKGROUND OF THE INVENTION

It is well known in the art that alkali metal salts of carboxylic acids having carboxyl groups which are attached to aromatic ring systems can be converted, i.e., transformed, into salts of different carboxylic acids having at least two carboxyl groups in the molecule by heating the said alkali metal salts to elevated temperatures. It is also known that this transformation is a solid-state reaction, that is, the alkali metal salt is heated in the solid state to produce the transformation, called disproportionation, with the product also being in the solid state. This solid-state reaction has caused considerable difficulties in the art with respect to its use in commercial operations. These difficulties include low heat transfer in the reactor and problems with the transporting and the mixing of the reactants and reaction products. In addition, during the soild-state reaction the solids fuse together to form large solids, herein referred to as "clinkers", which are extremely difficult, if not impossible, to handle, which foul the reactor, causing process interruptions, and which present problems in separation and recovery of the product.

It is also known in the art that the disproportionation reaction product, for example, dipotassium terephthalate, can be converted to the corresponding carboxylic acid, for example, terephthalic acid, by reacting the disproportionation reaction product with an aromatic carboxylic acid, for example, benzoic acid. This reaction is known in the art as a metathesis reaction. See, for example, U.S. Pat. No. 2,930,813.

During the metathesis reaction there is produced, in addition to the desired acid product, the alkali metal salt of the aromatic carboxylic acid which was originally subjected to the disproportionation reaction to produce the disproportionation reaction product. For example, potassium benzoate can be converted to dipotassium terephthalate in a disproportionation reaction; the dipotassium terephthalate is converted to terephthalic acid by reaction with benzoic acid in the metathesis reaction during which reaction there is also produced potassium benzoate, from which additional dipotassium terephthalate can be produced in a disproportionation reaction. Accordingly, it is quite important to recover the alkali metal salt of the carboxylic acid produced during the metathesis reaction for purposes of recycle and reuse in the disproportionation reaction. However, the disproportionation reaction-metathesis reaction process has met with considerable difficulties in the art with respect to its use in commercial operations. Among these are the problems of recovering, transporting, and reusing the alkali metal salt of the aromatic carboxylic acid which is, in effect, regenerated during the metathesis reaction.

In one process known in the art the metathesis reaction product is water washed and filtered to recover a solid filter cake with the resulting filtrate solution being then evaporated to dryness to recover the alkali metal salts for recycle as a solid to the disproportionation reactor. See, for example, U.S. Pat. No. 2,905,709. This technique, however, does not solve the major problem of recovering and transporting the alkali metal salt in a convenient handling method, as it is difficult and expensive to handle solids.

It is also known in the art from, for example, U.S. Pat. No. 2,930,813, to recover the spent catalyst by dissolving the disproportionation product in a hot aqueous solution, such as a hot aqueous methanolic-benzoic acid solution. The dissolved spent catalyst is then reacted with an appropriate compound which regenerates the catalyst. This procedure causes the introduction of a new chemical into the system, that is, the solvent for the spent catalyst, and in addition requires numerous changes in state not only of the catalyst but also of the other ingredients of the reaction product.

Still further, it is known that terephthalic acid can be produced by the reaction of dipotassium terephthalate with benzoic acid. See, for example, U.S. Pat. No. 2,930,813. When dipotassium terephthalate is reacted with benzoic acid to produce terephthalic acid, the reaction proceeds in two steps, as follows:

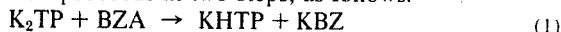
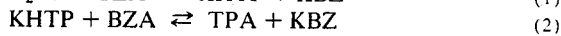

$$K_2TP + BZA \rightarrow KHTP + KBZ \quad (1)$$
$$KHTP + BZA \rightleftarrows TPA + KBZ \quad (2)$$

wherein $K_2TP$ is dipotassium terephthalate, BZA is benzoic acid, KHTP is potassium hydrogen terephthalate (also referred to herein as potassium acid terephthalate), KBZ is potassium benzoate, and TPA is terephthalic acid. The conversion of dipotassium terephthalate to terephthalic acid through the above-indicated reactions is known in the art as a metathesis reaction. As indicated by equations (1) and (2), this reaction proceeds in two steps wherein while step (1) proceeds nearly to completion, i.e., all or substantially all of the dipotassium tereptthalate is converted to potassium acid terephthalate, step (2) is reversible and, accordingly, the potassium terephthalate is only about 80 percent converted to terephthalic acid under equilibrium conditions, i.e., under conditions where the products of the reaction are not removed from the reaction vessel as they are formed.

Terephthalic acid is of considerable importance in industry as a starting material in such applications as the manufacture of synthetic fibers of the polyester type; therefore, there has been considerable activity in the art directed toward the economic and convenient production of large quantities of relatively pure terephthalic acid. One problem encountered in relation to the preparation of terephthalic acid in accordance with equations (1) and (2) above has been in obtaining complete reaction of the potassium acid terephthalate in order to maximize the production of terephthalic acid from the dipotassium terephthalate starting material and in the separation of the terephthalic acid product from the crude reaction mixture.

THE INVENTION

It is an object of this invention to provide an improved process for the disproportionation of carboxylic acid salts.

Another object of this invention is to provide a process wherein the disproportionation of carboxylic acid salts is conducted in a fluid medium.

Another object of this invention is to provide a process wherein the alkali metal salt utilized in the disproportionation process is introduced into the disproportionation reactor, recovered from the reactor and regenerated, and then recycled to the disproportionation reactor while being maintained as a dispersed solid in a fluid medium.

It is yet another object of this invention to provide a process wherein the disproportionation catalyst is introduced into the disproportionation reactor, recovered from the reactor and regenerated, and then recycled to the reactor while being maintained in the solid state.

A still further object of the invention is to provide a process for the production of high-purity terephthalic acid. It is another object of this invention to provide a process for the efficient production of terephthalic acid by the reaction of dipotassium terephthalate with benzoic acid.

Other aspects, objects and the several advantages of the invention will be apparent to one skilled in the art from the following specification and the appended claims.

In accordance with the present invention, there is provided a slurry process for the conversion of benzoic acid to terephthalic acid and benzene with slurry recycle of potassium salts and slurry regeneration and recycle of zinc catalyst. The slurry process facilitates handling and transport of the reagents between steps and makes possible an economic process because of greatly increased heat and mass transfer rates in the solid-state reaction steps.

More particularly, in accordance with this invention there is provided a process for the conversion of an alkali metal salt of an aromatic carboxylic acid to an aromatic polycarboxylic acid having at least one additional carboxyl group which comprises the steps:

A. dispersing said alkali metal salt of an aromatic carboxylic acid and a disproportionation catalyst in a dispersant to form a slurry;
B. heating the resulting slurry of (A) in a disproportionation zone under disproportionation conditions for a time sufficient to effect the disproportionation of said alkali metal salt of an aromatic carboxylic acid;
C. quenching the resulting disproportionation reaction mass with water whereby there is formed a dispersant phase and an aqueous phase having dissolved therein said alkali metal salt of an aromatic polycarboxylic acid and dispersed therein said solid disproportionation catalyst;
D. recovering said solid disproportionation catalyst from said phases in (C);
E. contacting the resulting aqueous phase filtrate with an aromatic carboxylic acid whereby said alkali metal salt of an aromatic polycarboxylic acid is converted to an aromatic polycarboxylic acid and said aromatic carboxylic acid is converted to the alkali metal salt thereof;
F. filtering the resulting reaction mass of (E) to separate said aromatic polycarboxylic acid therefrom;
G. concentrating the resulting filtrate of (F);
H. adding additional dispersant to the resulting concentrate of (G) whereby there is formed a slurry of said dispersant and said alkali metal salt of an aromatic carboxylic acid;
I. recycling the resulting slurry of (H) to step (B);
J. contacting the removed disproportionation catalyst from step (D) with dispersant so as to form a slurry of said catalyst in said dispersant;
K. adding an aromatic carboxylic acid to the resulting slurry of (J) whereby there is formed a slurry of salt of said acid and catalyst in said dispersant; and
L. recycling the resulting slurry of (K) to step (B).

In accordance with one aspect of this invention, the conversion of an alkali metal salt of an aromatic carboxylic acid to an aromatic polycarboxylate is conducted in a slurry system. More precisely, the solid reactants and catalyst are dispersed in an inert organic dispersant to form a slurry which is thereafter subjected to the known disproportionation conditions. The slurry of the solid reactants in the organic dispersant thus provides improved handling, mixing, and heat transfer properties. Also, the produced solid product is not in a fused form but instead is carried as finely divided particles in the organic dispersant from which the product can be conveniently removed.

There is thus provided an improved disproportionation process for the conversion of an alkali metal salt of an aromatic carboxylic acid to an aromatic polycarboxylate containing at least one additional carboxyl group wherein a slurry comprised of an alkali metal salt of an aromatic carboxylic acid, a disproportionation catalyst and an inert high-boiling organic dispersant is subjected to heating at an elevated temperature, preferably in the presence of a carbon dioxide gaseous atmosphere, thus to form the desired polycarboxylate product.

In accordance with another aspect of this invention, a slurry of a solid metal salt of an aromatic carboxylic acid in a liquid dispersant is produced directly from a solution of the same metal salt dissolved in water. More precisely, there is provided a process whereby a water solution of a metal salt dissolved in water is contacted with a liquid dispersant in a mixing zone wherein the solution and dispersant are uniformly mixed to form a mixture of the solution and the dispersant. The mixture is treated in an evaporation zone wherein heat is applied to the mixture in sufficient quantity to substantially vaporize the water from the mixture thereby to form a slurry comprised of the solid metal salt of the carboxylic acid in the liquid dispersant. The thus formed slurry is thereafter removed from the evaporation zone for other uses.

The thus produced slurry containing the solid metal salt of the aromatic carboxylic acid in the dispersant is highly useful in the production of aromatic polycarboxylates by disproportionation of alkali metal salts of aromatic carboxylic acids wherein the metal salt is an alkali metal salt. In this use, the solid alkali metal salt is the feed material which is converted in the disproportionation reaction itself and the disproportionation reaction is conducted in a slurry system. Thus, the dispersant is not only the medium in which the dissolved alkali metal salt is converted to the solid state and transported therein to the disproportionation reaction, but it is also the dispersant for the disproportionation reaction itself. Accordingly, the entire cycle, including the disproportionation reaction, the preliminary recovery of the aromatic polycarboxylate from the disproportionation reaction product (wherein the aromatic polycarboxylate is in a water phase and the spent disproportionation reaction catalyst is in an organic phase), the metathesis reaction, and the conversion of the alkali metal salt-containing solution to the above-described slurry, is conducted entirely in a fluid medium. At no time are any of the materials required to be handled solely as solids even though, for example, the alkali metal salt passes from the dissolved to the solid state.

There is thus provided an improved disproportionation process for the conversion of an alkali metal salt of an aromatic carboxylic acid to an aromatic polycarboxylate containing at least one additional carboxyl group wherein a slurry comprised of an alkali metal salt of an aromatic carboxylic acid, a disproportionation catalyst and an inert high-boiling organic dispersant is subjected to heating at an elevated temperature, preferably in the presence of a gaseous carbon dioxide atmosphere, thus to form the desired polycarboxylate product. The effluent from the disproportionation reaction is a slurry comprised of the desired aromatic polycarboxylate, the spent disproportionation catalyst and the dispersant. The disproportionation reactor slurry is then introduced into a separation zone wherein it is contacted with water to produce two liquid phases, one of which being comprised of the spent disproportionation catalyst in the dispersant and the other being a solution of the desired aromatic polycarboxylate in water. The two liquid phases are easily separated, for example, by decantation. It is the water solution of the desired aromatic polycarboxylate which is introduced into the metathesis reactor which was mentioned previously for production of the aromatic carboxylic acid with consequent regeneration of the alkali metal salt of the aromatic carboxylic acid.

In carrying out the steps of the process of this invention, the conversion of a metal oxide to the corresponding metal salt of an aromatic carboxylic acid is conveniently conducted in a slurry system. More precisely, the solid metal oxide is dispersed in an inert organic dispersant to form a slurry; the slurry is thereafter contacted in a reaction zone with an aromatic carboxylic acid at an elevated temperature for a time sufficient to convert the metal oxide to the corresponding metal salt of the aromatic carboxylic acid. This reaction produces a second slurry comprised of the solid metal salt of the aromatic carboxylic acid and the organic dispersant.

During the water quenching of the disproportionation reaction effluent, the disproportionation catalyst, which is a metal salt of an aromatic carboxylic acid, is converted to metal carbonates and oxides, primarily oxide. The water-quenched disproportionation reactor effluent slurry is then introduced into a separation zone, as hereinafter described, wherein the aromatic polycarboxylate product is separated. Thereafter a slurry comprised only of the metal oxide and organic dispersant is formed and then contacted with an aromatic carboxylic acid to regenerate the disproportionation catalyst.

In accordance with another embodiment of this invention, a process is provided for the production of terephthalic acid which comprises reacting dipotassium terephthalate with benzoic acid to produce a reaction mixture; phase separating and recovering benzoic acid, potassium acid terephthalate, and terephthalic acid from the reaction mixture which is comprised of potassium benzoate, benzoic acid, potassium acid terephthalate, and terephthalic acid; reacting the benzoic acid with the potassium acid terephthalate in the presence of the terephthalic acid to produce a second reaction mixture containing an additional quantity of terephthalic acid and, thereafter, phase separating and recovering the terephthalic acid from the second reaction mixture.

By this process there is produced a terephthalic acid product of high purity and, in addition, the reaction in equation (2) above proceeds to substantial completion, thus making necessary the removal of little, if any, unreacted potassium acid terephthalate.

In further accordance with this invention, a reaction mixture comprising a slurry of benzoic acid, potassium acid terephthalate, potassium benzoate and terephthalic acid, wherein the potassium benzoate is in the dissolved state and the benzoic acid, potassium acid terephthalate and terephthalic acid are in the undissolved state, is introduced into a first purification zone wherein the reaction mixture is treated with water at a temperature sufficient to maintain the benzoic acid, potassium acid terephthalate and terephthalic acid substantially in the undissolved state and the potassium benzoate substantially in the dissolved state, accompanied by the separation and removal of the dissolved material thereby to produce a second slurry comprised of benzoic acid, potassium acid terephthalate and terephthalic acid in the undissolved state. The second slurry is then introduced into a second purification zone wherein it is treated with water at a temperature sufficient to dissolve the potassium acid terephthalate and benzoic acid, which then react to produce additional quantities of terephthalic acid, which immediately precipitates, and potassium benzoate, which is removed from the second purification zone in the dissolved state. The terephthalic acid is simultaneously removed from the second zone in the undissolved state in a third slurry and thereafter dried to thus produce a terephthalic acid of high purity.

The continuous slurry process of the present invention is further illustrated with reference to the accompanying drawing, which represents a diagrammatic view of the process. For purposes of illustrating a presently preferred embodiment, the process shown is the conversion of benzoic acid to terephthalic acid. However, it is not intended that the scope of the invention be limited thereto.

In the process of the invention the major reaction occurs in reactor 1 wherein solid particles of potassium benzoate (KBz) dispersed in terphenyl diluent are disproportionated to potassium terephthalate ($K_2TP$) using solid zinc benzoate ($Zn(Bz)_2$) as catalyst. Benzene also is present as byproduct. Reactor 1 can be continuous or batch. Carbon dioxide is continuously pressured into the reactor via line 2 and continuously released through a pressure reduction valve (not shown) in line 3. Much of the byproduct benzene is removed with the carbon dioxide through line 3. Typical operating conditions for the disproportionation reactor are as follows:

| | |
|---|---|
| Temperature | 825° F. to 860° F. |
| Pressure | 800 psig |
| Residence time | 0.3 to 1 hour |
| Conversion | 90% |
| Selectivity | 85% |

| Feed | Parts by Weight | Product | Parts by Weight |
|---|---|---|---|
| Potassium benzoate | 29.5 | Potassium benzoate | 2.9 |
| Dipotassium phthalates | 3.9 | Dipotassium phthalates | 22.0 |
| Zinc benzoate | 1.5 | Zinc oxide | 0.4 |
| Terphenyl | 40.1 | Terphenyl | 40.1 |
| | | Benzene | 7.4 |
| | | Potassium carbonate | 1.1 |
| | | Residues | 1.1 |

The terphenyl slurry of KBz is continuously pumped into reactor 1 via line 4 as illustrated. A terphenyl slurry of Zn(Bz)$_2$ is also introduced into reactor 1 via line 5. The terphenyl slurry containing the potassium terephthalate product is removed from the reactor via conduit 6. The dipotassium phthalates in the product are essentially the para isomer (the desired product) with small amounts of the ortho isomer and traces of the meta isomer and tribasic acids.

The reactor effluent, consisting of a slurry of solid dipotassium phthalates, catalyst and terphenyl diluent, is passed to quench zone 7. About 1 part water is added via conduit 31 per part of slurry in zone 7 for the purpose of separating the dipotassium phthalates from the terphenyl. Two liquid phases thus are formed: a water phase containing the dissolved phthalates and a terphenyl phase containing residual benzene. A solid phase also remains, consisting essentially of catalyst, now zinc oxide after addition of water.

Conditions for quench zone 7 are as follows:

| | |
|---|---|
| Temperature | 570° F. to 480° F. |
| Pressure | 1000 to 600 psia |
| Residence time | 0.25 hour |

| Water phase | Parts by Weight | Terphenyl phase | Parts by Weight | Solid phase | Parts by Weight |
|---|---|---|---|---|---|
| Potassium benzoate | 2.9 | Terphenyl | 40.1 | Zinc oxide | 0.4 |
| Potassium phthalates | 22.0 | Benzene | 7.4 | Residue | 1.1 |
| Potassium carbonate | 1.1 | | | | |
| Water | 76.0 | | | | |

The solid phase settles into the water phase in separation zone 8. The water phase is passed via conduit 33 to separation zone 9 wherein solids are removed by filtration or centrifugation. The solid phase filter cake from separation zone 9 is passed via conduit 35 to zone 42 where it is redispersed with some of the terphenyl which is passed from the terphenyl phase in zone 8 by conduit 34 to zone 42 to form a slurry of the solid zinc oxide particles in terphenyl. The resulting slurry of solid zinc oxide and terphenyl is then passed via conduit 10 to catalyst preparation zone 11 wherein molten benzoic acid is added via conduit 12 to convert the zinc oxide to zinc benzoate.

Although the residue is shown as passing into the catalyst preparation step, it may be advantageous to remove a portion of the residue along with zinc oxide prior to this step to prevent its buildup on recycling. If all of the residue is carried into the catalyst preparation step, the good solubility of zinc benzoate in terphenyl at 315° F. permits its separation by filtration after removal of the benzene and water. The catalyst mixture is passed via conduit 36 to dryer 13, dried of water which is removed by conduit 38, and recycled via conduit 5 to the disproportionation reactor 1.

Alternatively, the zinc oxide filter cake from filter 9 can be dropped directly into a catalyst regeneration tank located between evaporator 14 and dryer 15. Water is removed from evaporator 14 by conduit 30. Into this alternate catalyst regeneration tank is also passed a terphenyl slurry of solid potassium benzoate particles from evaporator 14. Molten benzoic acid is now added to convert the zinc oxide to zinc benzoate, as described for regeneration step 11. The resulting slurry of solid zinc benzoate and solid potassium benzoate in terphenyl is dried in dryer 15, from which water is removed via conduit 40, and recycled to the disproportionation reactor 1 by way of conduit 4.

The water phase filtrate from filter 9 containing the dissolved phthalates can be decolorized, clarified by treatment with charcoal and precoat filtration (not shown) and then passed via 16 to metathesizer 17 wherein molten benzoic acid is added via conduits 41 and 18 to effect the precipitation of crude terephthalic acid crystals.

Conditions for the operation of metathesizer 17 are as follows:

| | |
|---|---|
| Temperature | 275° F. |
| Residence time | 0.5 hour |

| Feed | Parts by Weight | Precipitate | Parts by Weight | Filtrate | Parts by Weight |
|---|---|---|---|---|---|
| Dipotassium phthalates | 22.0 | Terephthalic acid | 12.4 | Potassium benzoate | 29.5 |
| Potassium benzoate | 2.9 | Benzoic acid | 0.6 | Potassium phthalate | 3.9 |
| Potassium carbonate | 1.1 | | | Water | 106.0 |
| Water | 106.0 | | | Benzoic acid | 7.0 |
| Benzoic acid | 27.8 | | | | |

Conditions for operation of the catalyst preparation zone 11 are as follows:

The addition of a 30 percent excess of molten benzoic acid to the hot aqueous solution effects the precip-

| | |
|---|---|
| Temperature | 315° F. |
| Time | 0.5 hour |

| Feed | Parts by Weight | Overhead | Parts by Weight | Product | Parts by Weight |
|---|---|---|---|---|---|
| Zinc oxide | 0.4 | Water | 0.1 | Zinc benzoate | 1.5 |
| Carbon residue | 1.1 | Benzene | 0.1 | Carbon residue | 1.1 |
| Terphenyl | 50.0 | | | Terphenyl | 50.0 |
| Benzene | 1.1 | | | | |
| Benzoic acid | 1.2 | | | | | itation of the crude terephthalic acid crystals. The crystals are passed via conduit 26 to zone 19 and separated from the aqueous solution by filtration in zone 19 and recovered as a product of the process. The resulting recovered crystals can thereafter be passed via conduit 20 to a final purification zone 21. Conduit 37 serves to remove the desired crystal product. Conduit 39 serves to remove wash medium from zone 21. The aqueous filtrate from zone 19 containing largely potassium benzoate is passed via conduit 27 to concentrator 22 and then is concentrated by simple evaporation of water in concentrator 22, which is removed via conduit 28, until the salt concentration is about 35 weight percent. The resulting concentrate is then passed via conduit 29 to a second evaporation zone 14 from which water is removed via conduit 30. To the concentrated solution in zone 14 is now added via conduit 23 the bulk of the hot terphenyl from separator 8. Supplemental heating or cooling can be applied to the terphenyl in heat exchanger 24 in order to provide the required amount of sensible heat to evaporator 14. Addition of the hot terphenyl to the aqueous solution of potassium benzoate accomplishes two purposes: (1) the hot terphenyl vaporizes essentially all of the water with precipitation of the potassium benzoate, and (2) the precipitated potassium benzoate becomes slurried with the terphenyl for easy transport to disproportionation reactor 1. Any water remaining in the terphenyl slurry is removed by passage of the slurry via conduit 25 through a dryer 15 before the slurry is passed to reactor 1 through conduit 4. Additional water, if any, is removed via conduit 40.

The impure terephthalic acid crystals in separator 19 are washed free of impurities by several stages of water washing therein. This can be accomplished by slurrying the crystals with water, followed by filtration with water washing on the filter. The filter cake is then reslurried with water and filtered. Warm water at a temperature of 175° F. assists in the removal of impurities.

A presently preferred method of purifying the crystals involves passing them as a settled bed downward through a wash column countercurrently to a rising stream of wash water.

The organic dispersant useful herein is one which will not decompose under the conditions of the process, which is inert to the reactants, and which is relatively high-boiling. Such organic dispersants include aromatic hydrocarbons selected from the group consisting of polyaromatic compounds having three or more aromatic rings, polynuclear aromatics and mixtures thereof. Examples of such organic dispersants include terphenyls, quaterphenyls, pentaphenyls and heavier polyphenyls; binaphthyls; naphthalene, anthracene, phenanthrene, pyrene, triphenylene, chrysene, perylene, pentacenyl and mixtures thereof.

It is desirable that the organic dispersant remain in the liquid state throughout the process; thus, the compound should have a melting point below about 150°C. Mixtures of two or more of the compounds can be utilized to reduce the melting point of the dispersant. It is also desirable that the dispersant have a relatively high boiling point, for example, above about 250° C., in order to aid in maintaining the reaction pressure at a low level.

The organic dispersant is present in the slurry in an amount in the range of from 25 to 80 percent by weight of the total weight of the slurry and preferably in an amount in the range of from 60 to 75 percent by weight of the total weight of the slurry.

The slurry is formed by mixing the organic dispersant with the alkali metal salt of the aromatic carboxylic acid desired to be transformed. Any conventional method of mixing a solid with a liquid can be used to form the slurry. For example, if a batch reactor is employed, the dispersant, in liquid form, is added to the reactor; then the solid salt to be converted, such as potassium benzoate, and a suitable disproportionation catalyst, such as zinc benzoate, both preferably in finely divided form, are added to the reactor while the liquid is being stirred. If a continuous reactor is employed, the solids are metered into a separate stirred mix tank which contains the liquid dispersant wherein the slurry is formed, and the slurry is then introduced into the reactor. After mixing, the process proceeds according to the well-known disproportionation process. Thus, the slurry, comprised of an alkali metal salt of an aromatic carboxylic acid and a suitable disproportionation catalyst, is subjected to heating in a gas atmosphere in order to effect the conversion of the alkali metal salt to the desired aromatic polycarboxylate.

As starting materials for the process of this invention, in addition to the presently preferred alkali metal salts of benzoic acid, the salts of other aromatic mono- or polycarboxylic acids can be used. Such salts are those of the formula

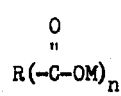

wherein R is an aromatic or alkyl aromatic group having six to 15 carbon atoms, M is an alkali metal and $n$ is the integer 1, 2 or 3. Such salts are readily prepared from the corresponding acids. Such acids include, for example, benzoic acid, 2-naphthalene carboxylic acid, 4-biphenylcarboxylic acid, 2,6-naphthalenedicarboxylic acid, phthalic acid, isophthalic acid, terephthalic acid, 2-anthracenecarboxylic acid, 1,5-anthracenedicarboxylic acid, 1,5,9-anthracenetricarboxylic acid, 3-phenanthrenecarboxylic acid, 2,3,4-trimethylbenzenecarboxylic acid, 2,4,6-trimethylbenzene-1,3-dicarboxylic acid, 2-ethyl-4-hexyl 6-methylbenzene-1,3-dicarboxylic acid, 2,4-dibutylbenzene-1,3,5-tricarboxylic acid, and the like.

In all the above-mentioned carboxylic acid salts the aromatic ring may carry alkyl radicals, in addition to the carboxylate groups, provided that these alkyl radical substituents do not bring about a decomposition of the molecule at temperatures equal to or lower than the reaction temperature.

When aromatic monocarboxylic acid salts are used as starting materials for the process according to the invention, the reaction products obtained thereby are industrially valuable alkali metal salts of dicarboxylic acids which can readily be converted to the corresponding dicarboxylic acids; i.e., for example, dipotassium terephthalate is readily converted to terephthalic acid.

The reaction can be conducted with or without transformation catalysts; however, it is presently preferred that the reaction be carried out in the presence of catalysts. Metals such as zinc, cadmium, mercury, lead, iron, manganese, magnesium, calcium and chromium, as well as compounds of these metals such as their oxides and salts formed with inorganic or organic acids and their metal-organic or their complex compounds, among others, their carbonates, bicarbonates, halides, sulfates, formates, phosphates, oxalates, fatty acid salts or the salts of the above metals formed with those acids which may serve as starting materials for the reaction according to the invention or which are formed by this reaction, for example, their benzoates, phthalates or terephthalates, may be used as catalysts.

Preferred catalysts are, for example, iron, lead, zinc, mercury, cadmium, and their compounds, such as oxides, organic and inorganic salts, etc., although other metals and compounds may be used. Such compounds as metallic cadmium, cadmium oxide, cadmium iodide, cadmium chloride, cadmium fluoride, cadmium sulfate, cadmium phosphate, cadmium carbonate, cadmium acetate, cadmium soaps, cadmium benzoate, cadmium phthalate, cadmium isophthalate, cadmium terephthalate, metallic zinc, zinc oxide, zinc iodide, zinc chloride, zinc sulfate, zinc phosphate, zinc carbonate, zinc acetate, zinc soaps, zinc benzoate, zinc phthalate, zinc isophthalate, zinc terephthalate, and other metals and compounds can be used as catalysts.

The amount of catalyst used can vary within wide limits and can range from 0.1 to 100 grams of catalyst per mol of aromatic carboxylate employed, more preferably in the range of 1 to 50 grams per mol. The catalysts can be especially finely divided throughout the reaction mixture by transforming an aqueous solution of the salts serving as the starting materials, which contain the catalysts dissolved or suspended therein, into a dry power by spray-drying or by other suitable methods. The above-named catalysts also can be used in conjunction with known carriers such as kieselguhr. The catalysts may be used as such or supported on carriers, and may be recovered from the insoluble residues of the reaction and reused in many instances without further purification.

The conversion of the alkali metal carboxylate is effected substantially completely in the absence of oxygen or water.

In addition to the use of carbon dioxide, the process of this invention can be carried out in other gas atmospheres. Examples of such gases include nitrogen, methane, argon, neon, butane, ethane, helium and the like. When carbon dioxide is employed, an atmosphere is utilized which contains additionally at least 50 mol percent carbon dioxide. However, the presence of neither carbon dioxide nor other gases is essential to obtaining the high conversion of initial reactant in the atmosphere in which the thermal conversion is carried out. In addition, carbon monoxide or a mixture of CO and $CO_2$ can be used in carrying out the process of the invention.

Pressures in the range of 0 to 5000 psig or more can be employed, but it is advantageous and preferable, in keeping with one embodiment of the invention, that lower pressures in the range of 0 to 1000 psig be employed.

Sufficient reaction time should be employed to effect the desired degree of conversion. Generally, reaction times in the range of about 1 second to about 48 hours, preferably 5 seconds to 2 hours, are suitable.

If desired, the disproportionation reaction can be promoted by addition of alkali metal salts, preferably potassium salts of derivatives of cyanic acid or its polymers, to the reaction mixture. Suitable polymers or derivatives of cyanic acid are, for example, cyanuric acid, cyanamide and dicyandiamide. The derivatives of cyanic acid preferably are employed in the form of their potassium salts, provided they form salts with alkali metals. In one preferred embodiment potassium cyanate is employed.

The metal oxide referred to in this invention is an oxide of a metal selected from the group consisting of zinc, cadmium, mercury, lead, iron, manganese, magnesium, calcium and chromium. Thus, the metal oxides converted to metal salts by the process of this invention are zinc oxide, cadmium oxide, mercury oxide, lead oxide, iron oxide, manganese oxide, magnesium oxide, calcium oxide and chromium oxide, these oxides being formed during the disproportionation reaction. Salts of the above metals formed with aromatic carboxylic acids serve as catalysts for the disproportionation of alkali metal salts of aromatic carboxylic acids.

The particular aromatic carboxylic acids used in this invention for the conversion of the metal oxide to the corresponding metal salt are preferably in the molten state when they are placed in contact with the metal oxide-containing slurry. In addition, the quantity of aromatic carboxylic acid utilized to regenerate the catalyst is expressed in stoichiometric terms. Accordingly, the mol ratio of the aromatic carboxylic acid to the metal oxide in the reaction zone is in the range of 1.9 to 2.1, preferably 1.95 to 2.0, mols aromatic carboxylic acid per mol of metal oxide.

The regeneration of the metal oxide to the metal salt of the aromatic carboxylic acid in the presence of the organic dispersant upon contact with the molten aromatic carboxylic acid is conducted at a temperature in the range of 125° to 260° C., preferably 145° to 225° C. The time of contact between the spent metal catalyst is sufficient to produce a second slurry in the reaction regeneration zone comprised of the metal salt of the aromatic carboxylic acid and the organic dispersant. This time is generally in the range of 0.01 to 10, preferably 0.1 to 2, hours.

The organic dispersant is present in the metal oxide slurry in the reaction zone in an amount in the range of from 10 to 99.9 percent by weight of the total weight of the slurry and preferably in an amount in the range of from 40 to 99.5 percent by weight of the slurry.

Preliminary to the regeneration of the spent metal catalyst, which is dispersed in the organic dispersant, the concentration of the organic dispersant in the slurry can be adjusted to the concentrations previously mentioned by a separation step such as settling, cycloning, filtering, centrifuging and the like. Thus, the dispersion of metal oxide particles in dispersant obtained from the hereinafter described water quench step can be passed to a cyclone which removes, for example, as much as 80 percent of the organic dispersant as overflow for direct recycle to the disproportionation reactor or to other processing steps. Bottoms from the cyclone contain a high concentration of metal oxide particles in dispersant and are passed to the catalyst regeneration step wherein the metal oxide is converted to the corresponding metal salt of an aromatic carboxylic acid. The bulk of the organic dispersant thus can be bypassed around the catalyst regeneration step.

The following example is provided to illustrate further the process of the invention; however, it should not be construed as limiting the scope thereof.

EXAMPLE

A material balance for the system as described herein in conjunction with the description of the drawing follows, showing representative flows of the components in the several streams as numbered in the drawing. Operating conditions for the various steps are the same as those given previously.

| Component | | Stream, lb/hr. | | | |
|---|---|---|---|---|---|
| | | 41 | 18 | 16 | 26 |
| (1) | Benzoic acid | 68,600 | 65,000 | 4,000 | 5,000 |
| (2) | Potassium benzoate | | | 8,600 | 97,075 |
| (3) | Terephthalic acid | | | — | 42,900 |
| (4) | Benzene | | | | |
| (5) | Dipotassium terephthalate | | | 75,375 | 11,000 |
| (6) | Water | | | 195,000 | 195,000 |
| (7) | Carbon dioxide | | | | |
| (8) | Terphenyl | | | | |
| (9) | Zinc benzoate | | | | |
| (10) | Zinc oxide | | | | |
| | | 20 | 27 | 39 | 37 | 28 | 29 |
| (1) | | 1,000 | 4,000 | 900 | 100 | | 4,000 |
| (2) | | 2,000 | 95,075 | 1,900 | 100 | | 95,075 |
| (3) | | 42,900 | — | | 42,900 | | — |
| (4) | | — | | | | | |
| (5) | | | 11,000 | | | | 11,000 |
| (6) | | 25,000 | 170,000 | 24,000 | 1,000 | 70,000 | 100,000 |
| | | 30 | 23 | 25 | 40 | 4 | 2 |
| (1) | | | | 4,000 | | 4,000 | |
| (2) | | | | 95,075 | | 95,075 | |
| (3) | | | | — | | — | |
| (4) | | | | — | | — | |
| (5) | | | | 11,000 | | 11,000 | |
| (6) | | 110,000 | 20,000 | 10,000 | 10,000 | | |
| (7) | | | | — | | | 1,000 |
| (8) | | | 100,000 | 100,000 | | 100,000 | |
| | | 5 | 3 | 6 | 31 | 32 | 33 |
| (1) | | | | 4,000 | | 4,000 | 4,000 |
| (2) | | | | 8,600 | | 8,600 | 8,600 |
| (3) | | | | — | | — | — |
| (4) | | | 21,100 | — | | — | — |
| (5) | | | | 75,375 | | 75,375 | 75,375 |
| (6) | | | | — | 223,000 | 223,000 | 200,000 |
| (7) | | | 1,000 | — | | — | |
| (8) | | 17,500 | | 117,500 | | 117,500 | |
| (9) | | 4,400 | | — | | — | |
| (10) | | | | 1,185 | | 1,185 | 1,185 |
| | | 34 | 35 | 10 | 12 | 36 | 38 | 5 |
| (1) | | | | 3,600 | | | | |
| (2) | | | | | | | | |
| (3) | | | | | | | | |
| (4) | | | | | | | | |
| (5) | | | | | | | | |
| (6) | | 3,000 | 5,000 | 8,000 | | 8,000 | 8,000 | |
| (7) | | | | | | | | |
| (8) | | 17,500 | | 17,500 | | 17,500 | | 17,500 |
| (9) | | | | | | 4,785 | | 4,785 |
| (10) | | | 1,185 | 1,185 | | | | |

The above data set forth representative flows in the system of this invention. Such data further illustrate the effectiveness of the system for the production of terephthalic acid from benzoic acid with recovery and recycle of potassium values and zinc catalyst, all being conducted in the slurry state.

Reasonable variations and modifications can be made, or followed, in the process of this invention without departing from the spirit and scope thereof.

What is claimed is:

1. A process for the conversion of an alkali metal salt of an aromatic carboxylic acid to an aromatic polycarboxylic acid having at least one additional carboxyl group which comprises the steps:

A. dispersing said alkali metal salt of an aromatic carboxylic acid and a disproportionation catalyst, wherein said catalyst is an aromatic carboxylic acid salt of a metal selected from the group consisting of zinc, cadmium, mercury, lead, iron, manganese, magnesium, calcium and chromium, in a high-boiling organic dispersant to form a slurry;

B. heating the resulting slurry of (A) in a disproportionation zone under disproportionation conditions for a time sufficient to effect the disproportionation of said alkali metal salt of an aromatic carboxylic acid;

C. quenching the resulting disproportionation reaction mass with water whereby there is formed a dispersant phase and an aqueous phase having dissolved therein said alkali metal salt of an aromatic polycarboxylic acid and dispersed therein said solid disproportionation catalyst;

D. recovering said solid disproportionation catalyst from said phases in (C);

E. contacting the resulting aqueous phase filtrate with an aromatic carboxylic acid corresponding to the acid of step (A) whereby said alkali metal salt of an aromatic polycarboxylic acid is converted to an aromatic polycarboxylic acid and said aromatic carboxylic acid is converted to the alkali metal salt thereof;

F. filtering the resulting reaction mass of (E) to separate said aromatic polycarboxylic acid therefrom;

G. concentrating the resulting filtrate of (F);

H. adding additional dispersant to the resulting concentrate of (G) whereby there is formed a slurry of said dispersant and said alkali metal salt of an aromatic carboxylic acid;

I. recycling the resulting slurry of (H) to step (B);

J. contacting the removed disproportionation catalyst from step (D) with dispersant so as to form a slurry of said catalyst in said dispersant;

K. adding an aromatic carboxylic acid to the resulting slurry of (J) whereby there is formed a slurry of salt of said acid and catalyst in said dispersant, said acid corresponding to the acid of step (A); and L. recycling the resulting slurry of (K) to step (B).

2. A process according to claim 1 wherein said dispersant is selected from the group consisting of polyaromatic compounds having three or more aromatic rings, polynuclear aromatics, and mixtures thereof.

3. A process according to claim 2 wherein said dispersant is terphenyl.

4. A process according to claim 3 wherein said catalyst is zinc benzoate.

5. A process according to claim 4 wherein said aromatic carboxylic acid is benzoic acid and said aromatic polycarboxylic acid is terephthalic acid.

6. A process according to claim 1 wherein step (B) is carried out in a gas atmosphere.

7. A process according to claim 6 wherein said gas is selected from the group consisting of carbon dioxide, carbon monoxide, nitrogen, methane, argon, neon, butane, ethane, helium.

8. A process according to claim 1 wherein (A) potassium benzoate and zinc benzoate are dispersed in terphenyl; (B) the resulting slurry is heated to a temperature in the range of 350° to 500°C at a pressure in the range of 0 to 5000 psig for a time sufficient to effect the conversion of said potassium benzoate to potassium terephthalate; (C) the resulting slurry is quenched to form a terphenyl phase and an aqueous phase having zinc oxide and potassium terephthalate therein; (D) the aqueous phase of (C) is filtered to remove the zinc oxide, (E) the resulting aqueous phase filtrate is contacted with benzoic acid whereby there is formed terephthalic acid and potassium benzoate; (F) terephthalic acid is recovered as a product of the process from (E) by filtration; (G) the resulting filtrate comprising water and potassium benzoate is heated to form a concentrate thereof; (H) hot terphenyl is added to the concentrate of (G) to form a slurry of potassium benzoate in terphenyl; (I) the resulting slurry of (H) is recycled to (B); (J) the zinc oxide removed in step (D) is contacted with terphenyl to form a slurry thereof; (K) benzoic acid is added to the slurry of (J) whereby there is formed a slurry of zinc benzoate in terphenyl; and (L) the resulting slurry of (K) is recycled to step (B).

* * * * *